(12) United States Patent
Menges et al.

(10) Patent No.: US 8,118,491 B2
(45) Date of Patent: Feb. 21, 2012

(54) ROLLING ELEMENT CHAIN

(75) Inventors: Martin Menges, Homburg (DE); Franziska Hausberger, Saarbrucken (DE)

(73) Assignee: Schaeffler Technologies GmbH & Co., KG, Herzogenaurach (DE)

( * ) Notice: Subject to any disclaimer, the term of this patent is extended or adjusted under 35 U.S.C. 154(b) by 592 days.

(21) Appl. No.: 12/293,833

(22) PCT Filed: Mar. 14, 2007

(86) PCT No.: PCT/EP2007/052377
§ 371 (c)(1),
(2), (4) Date: Jan. 30, 2009

(87) PCT Pub. No.: WO2007/107483
PCT Pub. Date: Sep. 27, 2007

(65) Prior Publication Data
US 2011/0058758 A1 Mar. 10, 2011

(30) Foreign Application Priority Data
Mar. 20, 2006 (DE) .......................... 10 2006 012 623

(51) Int. Cl.
*F16C 33/46* (2006.01)
*F16C 19/00* (2006.01)
(52) U.S. Cl. ........................................................ 384/51
(58) Field of Classification Search .................... 384/13, 384/15, 43–45, 51
See application file for complete search history.

(56) References Cited

U.S. PATENT DOCUMENTS

| 5,800,064 | A | * | 9/1998 | Ohya | 384/44 |
| 6,070,479 | A | * | 6/2000 | Shirai | 384/51 |
| 6,802,647 | B2 | * | 10/2004 | Hausberger et al. | 384/45 |
| 7,066,650 | B2 | * | 6/2006 | Ishihara | 384/44 |
| 7,467,895 | B2 | * | 12/2008 | Kurachi et al. | 384/43 |
| 2005/0152625 | A1 | | 7/2005 | Nagao et al. | |
| 2006/0120637 | A1 | * | 6/2006 | Kuwabara | 384/44 |
| 2007/0081746 | A1 | | 4/2007 | Chen et al. | |

FOREIGN PATENT DOCUMENTS

| DE | 1822746 | | 12/1960 |
| DE | 8914085 | | 2/1990 |
| DE | 102004015843 | | 5/2005 |
| EP | 0890754 | | 1/1999 |
| EP | 890755 | A2 * | 1/1999 |
| EP | 0989314 | | 3/2000 |
| EP | 1342928 | | 9/2003 |
| EP | 1619401 | | 1/2006 |
| JP | 2000314420 | A * | 11/2000 |
| JP | 2007092899 | A * | 4/2007 |

* cited by examiner

*Primary Examiner* — Marcus Charles
(74) *Attorney, Agent, or Firm* — Volpe and Koenig, P.C.

(57) ABSTRACT

A rolling element chain (8) which includes a plurality of rolling elements that are disposed in a row one after the other in a cage strip (12) and interspaced by separating webs (13) of the cage strip (12). The separating webs (13), on their front end disposed transverse to the rolling element chain (8), are connected to a flexible cage belt (15) which extends along the rolling element chain (8). On the other free front end disposed transverse to the rolling element chain (8), the separating webs (13) have recesses (16, 20) for engaging with a retaining rim (21, 18) for retaining the rolling element chain (8), with the recesses being continuous in a longitudinal direction of the rolling element chain (8).

6 Claims, 4 Drawing Sheets

ROLLING ELEMENT CHAIN

CROSS-REFERENCE TO RELATED APPLICATIONS

This application is a 371 National Phase of PCT/EP2007/052377, filed Mar. 14, 2007which claims the benefit of German Patent Application no. 102006012623.8, filed Mar. 20, 2006.

BACKGROUND

The present invention relates to a rolling element chain with a plurality of rolling elements arranged in a row, one after the other, in a cage strip. In particular, the invention relates to rolling element chains that circulate endlessly in endless recirculating channels of linear roller bearings.

DESCRIPTION OF RELATED ART

From EP 0 890 754 A1, for example, a ball chain became known in which a plurality of balls are arranged in a row, one after the other, in a cage strip. Balls arranged adjacent to each other are separated from each other by separating webs of the cage strip. Viewed transverse to the rolling element chain, at one front end, the separating webs are connected integrally to a flexible cage belt extended along the ball chain. This rolling element chain is arranged in an endless recirculating channel of a carriage provided for a linear roller bearing. The recirculating channel is bounded by opposing rim walls. The two rim walls of the recirculating channel are each provided with u-shaped grooves, wherein the flexible cage belt engages in one rim wall and wherein connection pieces engage in the other u-shaped groove of the other rim wall, wherein one connection piece connects two adjacent separating webs integrally to each other at their front end facing away from the flexible cage belt. This connection piece closes a ball pocket, so that the ball arranged in the ball pocket is completely enclosed. Viewed transverse to the ball chain, this connection piece projects and engages with its projecting part into the u-shaped groove of the rim wall of the recirculating channel.

The production of such ball chains with enclosed ball pockets is complicated, because the web walls of the separating webs bounding the ball pockets are curved spherically. The injection molding dies required here are complicated in their configuration and costly from an economic viewpoint.

Another disadvantage can be seen in that these rim walls of the recirculating channel are often part of an insert element made from plastic in an injection molding method, wherein this insert element is inserted or injection molded in place in the carriage otherwise made from steel. The rim walls bounding the recirculating channel have a thin-wall construction for structural reasons. For small-size lines of products, it can be difficult to provide the two opposing rim walls each with a u-shaped groove, so that the rolling element chain can engage with the flexible cage belt and with the mentioned connection pieces in these u-shaped grooves. The u-shaped grooves to be provided in the two rim walls would consequently lead to an unacceptably reduced wall thickness.

SUMMARY

The object of the present invention is to provide a rolling element chain that is simple to produce and that is also suitable for small-size linear roller bearings.

According to the invention, this objective is met in that the separating webs are provided, on the other side at their other front end arranged transverse to the roller element chain, with continuous recesses in the direction of extent of the rolling element chain for the engagement of a holding rim for holding the rolling element chain. Different than in the known ball chain, the separating webs project freely starting from the flexible cage belt. Consequently, the cage pockets bounded by the separating webs for holding the rolling elements are not completely enclosed. Even if the facing separating walls of the separating webs are curved, for example, concavely—in the case of rolling element chains injection molded from plastic—simple slide molds can be provided that allow removal transverse to the extent of the rolling element chain.

Advantageously, the separating webs are connected integrally to the cage belt; this integral connection can be realized without a problem when the rolling element chain is made from plastic in an injection molding process. Alternatively, for example, the separating pieces can be clipped onto the cage belt, if this is meaningful for special conditions of use.

Another essential advantage of the present invention can be seen in that these separating webs are provided on their free end with continuous recesses in the direction of extent of the rolling element chain. Previously, for problem-free holding of rolling element chains in an endless recirculating channel, it was necessary that the rolling element chain was engaged on its side facing the cage belt in the u-shaped groove of the rim wall of the recirculating channel. Now the invention goes along another way, namely in such a way that a projecting holding rim engages in these recesses of the separating webs. This arrangement of the continuous recess also allows the shaping of the rim walls with minimized cross section or wall thickness. It is sufficient, for an optimized wall thickness of the rim walls, if a tab is provided, viewed in section, on the rim wall and this tab is constructed along the recirculating channel and consequently forms this holding rim. Consequently, the rolling element chain according to the invention is suitable, in particular, for small-size linear roller bearings.

Often rolling element chains are inserted in endless recirculating channels for an endless rolling element circuit, wherein these rolling element chains themselves have a finite construction. This finite construction has the result that the two ends or end pieces of the rolling element chain are opposite each other in the recirculating channel. An improvement according to the invention provides that on at least one of the two end pieces—viewed in the direction transverse to the rolling element chain—on its other free front end facing away from the flexible cage belt there is a pressure tab projecting onto the other end piece as a stop for the two end pieces on each other. This pressure tab prevents undesired bending of the rolling element chain as will be explained in more detail below. In the rolling element chains according to the invention and also in known rolling element chains, only a flexible cage belt is provided. Consequently, the freely projecting separating webs can bend like a fan. In the improvement according to the invention, bending of these separating webs is limited to a permissible degree that stop the two end pieces with one pressure tab or with both pressure tabs on each other when this permissible bending is reached. Further bending of the separating webs is not possible.

A distance set in the rotating direction of the rolling element chain between the two end pieces is advantageously less than or equal to the reference circle end play of the rolling element chain and is greater than zero. The reference circle end play is influenced by the tolerance field position of the rolling element and the cage strip.

BRIEF DESCRIPTION OF THE DRAWINGS

Below, the invention is explained in more detail with reference to embodiments illustrated in a total of six figures. Shown are.

DETAILED DESCRIPTION OF THE PREFERRED EMBODIMENTS

Figure 1:
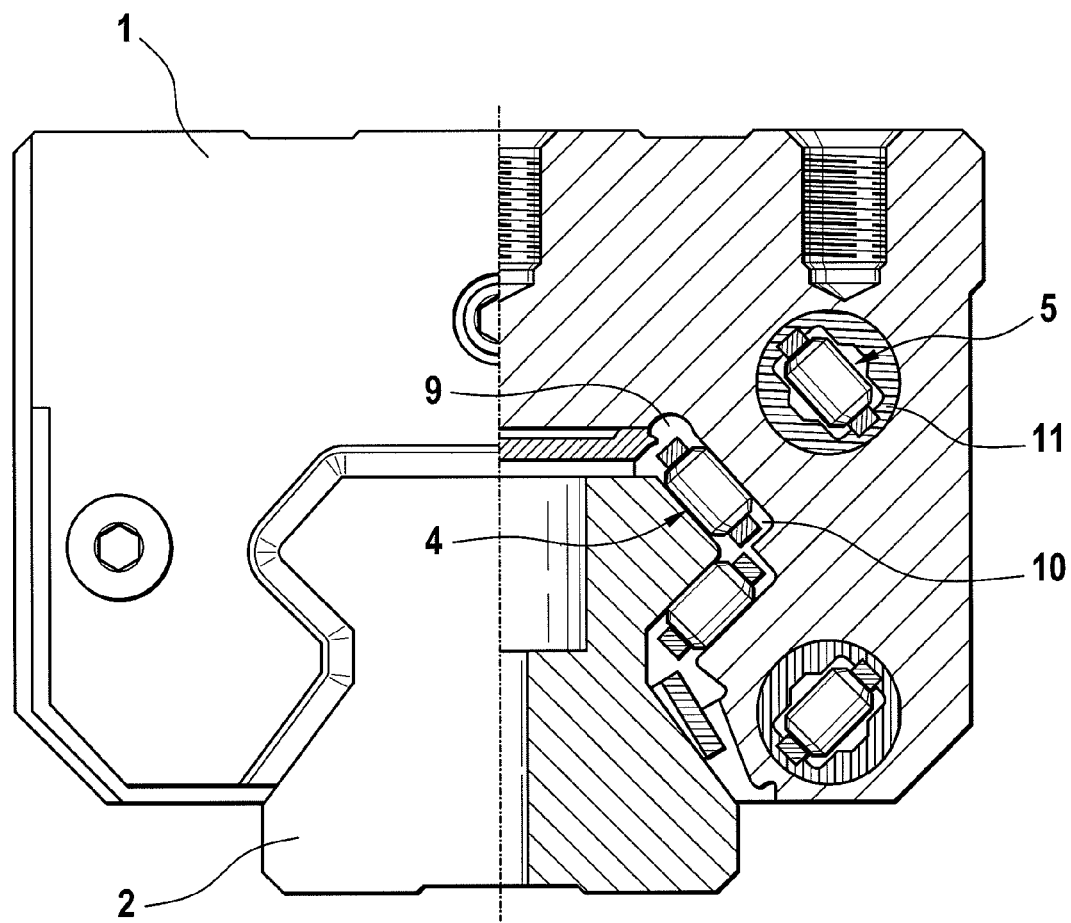
FIG. 1 is a cross sectional view through a linear roller bearing according to the invention with a rolling element chain according to the invention.
Figure 2:
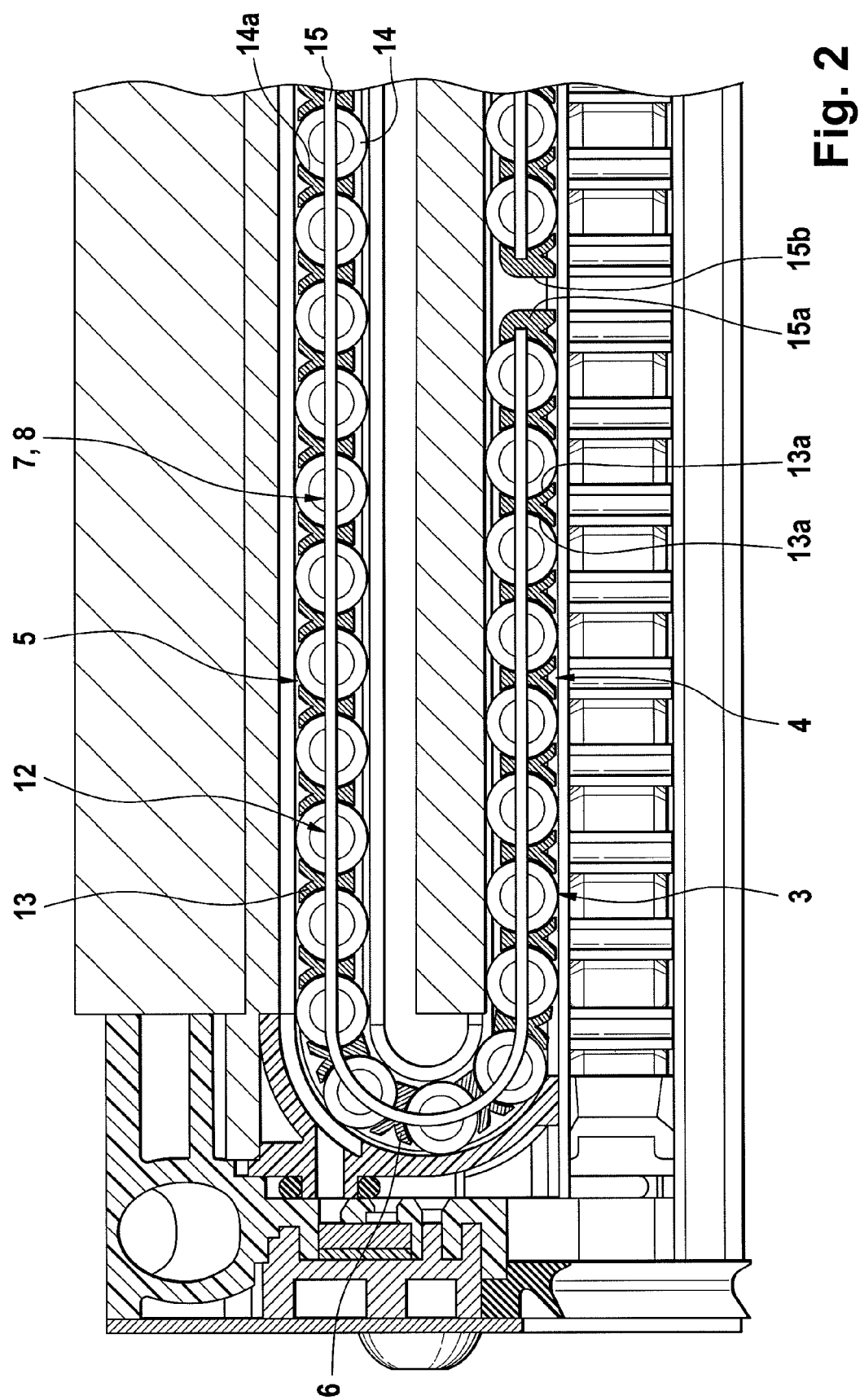
FIG. 2 is a longitudinal section view through the linear roller bearing from FIG. 1.

FIG. 1 shows, in cross section, a linear roller bearing according to the invention that is constructed in the present example as a recirculating roller bearing unit. This recirculating roller bearing unit comprises a carriage 1 that is supported by rollers along a guide rail 2. The carriage 1 is provided with a total of four endless recirculating channels 3, as shown in FIG. 2 in a partial section. These recirculating channels 3 comprise a load section 4, a return section 5, and two turnaround sections 6 connecting the load section 4 and the return section 5 in an endless manner. Rolling element chains 8 constructed as roller chains 7 are arranged in all of the endless recirculating channels 3.

The recirculating channels 3 have rim walls 9, 10, 11, wherein the rim walls 9, 10 are arranged in the load section 4 and wherein the rim walls 11 are arranged in the return section 5.

The roller chain 7 comprises—as shown in FIG. 2—a plurality of rollers 14 arranged in a row one after the other in a cage strip 12 and separated from each other by separating webs 13. The cage strip 12 is formed from separating webs 13 that are connected integrally on one side at a front end arranged transverse to the roller chain 7 to a flexible cage belt 15 that extends along the roller chain 7. This cage belt 15 is made from plastic in an injection-molding process.

Furthermore, from FIG. 2 it can be taken that the roller chain 7 has a finite construction and two end pieces 15a, 15b. These end pieces 15a, 15b are arranged with a gap therebetween—that is, spaced apart from each other. The gap is greater than or equal to zero and less than the reference circle end play of the rollers 14 in their cage pockets 14a. The cage pockets 14a are bounded by the separating webs 13, wherein facing separating walls 13a of two adjacent separating webs 13 define the shape of the cage pockets 14a. The separating walls 13a are curved concavely and adapted to the casing surfaces of the rollers 14.

Figure 3:
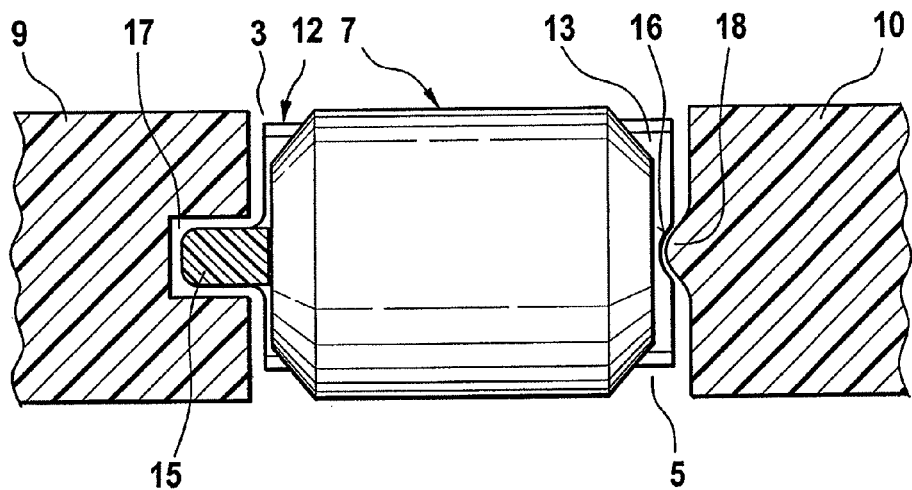
FIG. 3 is a cross sectional view through the rolling element chain according to the invention from FIG. 1.

In cross section, FIG. 3 shows in an enlarged view the roller chain 7 in the recirculating channel 3, wherein the opposing rim walls 9, 10 of the recirculating channel 3 are indicated. The separating webs 13 are provided at their other free front end arranged transverse to the roller element chain—i.e., each separating web 13 projects freely starting from the cage belt 15—with continuous recesses 16 in the direction of extent of the roller chain 7 and that are constructed in the present example as channels or grooves.

The cage belt 15 of the roller chain 7 engages in a u-shaped groove 17 of the rim wall 9. On the opposite side, a holding rim 18 formed integrally on the rim wall 10 engages in the recesses 16 of the separating webs 13. The holding rim 18 is formed continuously on the rim wall 10 in the circulating direction of the recirculating channel 3.

The roller chain 7 is guided without a problem in the recirculating channel 3 of the carriage 1. Even if the carriage 1 is removed from the guide rail 2, the roller chain 7 in the return section 5 of the recirculating channel 3 cannot sag in an unacceptable way, because the roller chain 7 is held on both longitudinal sides.

Figure 4:
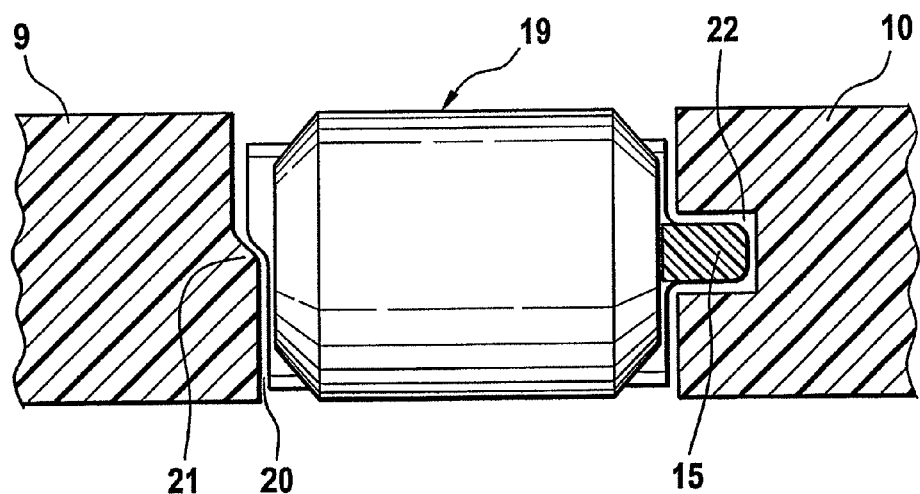
FIG. 4 is a cross sectional view of a variant according to the invention of a rolling element chain.

FIG. 4 shows a variant of the linear roller bearing described above, wherein below changed features are merely provided with supplemental item numbers. The roller chain 19 according to FIG. 4 likewise has a continuous recess 20 in the running direction of the rolling element chain. Different than in FIG. 3, however, this recess is not constructed as a groove or channel but instead as a radially opened step. Accordingly, the rim wall 9 has a peripheral holding rim 21 that engages in this recess 20. The rim wall 10 is provided with a u-shaped groove 22 in which the cage belt 15 of the roller chain 19 engages.

Figure 5:
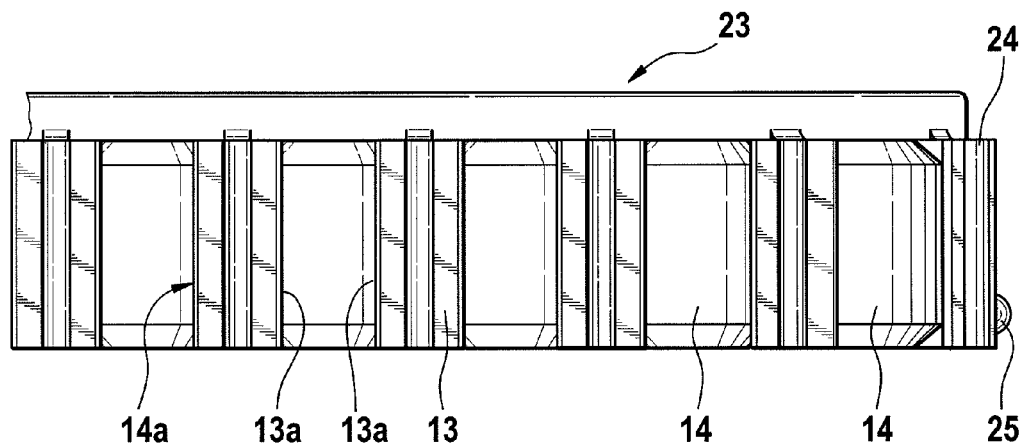
FIG. 5 is a view of a part of another rolling element chain according to the invention, and FIG. 6 a view showing three variants of an endless recirculating channel of the linear roller bearing from FIG. 1 with three different separating planes.

FIG. 5 shows another roller chain 23 that can be constructed just like the roller chains 7, 19 with respect to its holder in the endless recirculating channel 3. In addition, however, the roller chain 23 is provided on one of its end pieces 24 with a stop 25 that is turned toward the other end piece not shown here in the direction of extent of the roller chain 23 and projects toward this end piece. The stop 25, formed here like a tab, projects sufficiently far to the other opposing end piece not shown here that remaining play in the direction of extent of the roller chain 23 between the two end pieces is equal to or less than the reference circle end play of the rollers 14.

Figure 6:
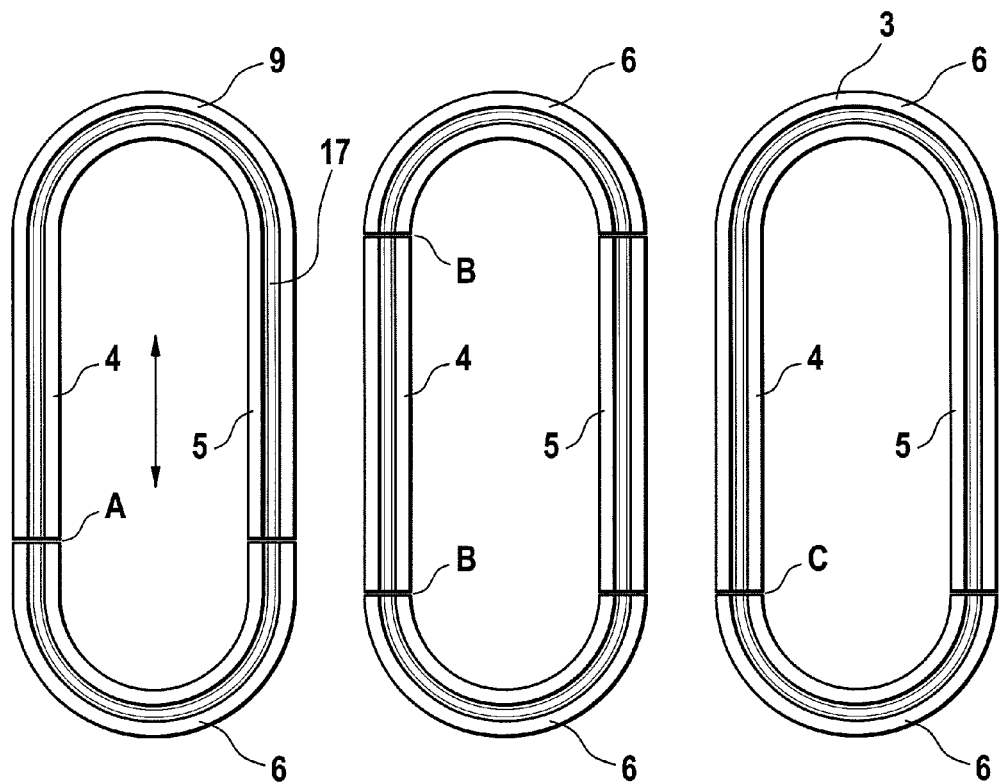

FIG. 6 shows three different division possibilities for the recirculating channel 3. In this schematic figure, the rim wall 9 is seen clearly with the u-shaped groove 17 formed in this wall. If this recirculating channel is part of an injection-molded element, it is possible to select the division planes A, B, C. In all of these cases, the die can be removed in the directions parallel to the load section or also return section. The separation plane A lies within the load section 4 or the return section 5. The separation plane B is straight in the transition from the turnaround section 6 to the load section 4 and the return section 5, namely at both turnaround sections 6. The separation plane C is arranged like the separation plane B, but only for one turnaround section 6. In the region of the opposite turnaround section, there is no separation plane.

The stop 25 formed as a pressure tab can be formed from the same material or plastic as the cage strip 12. It can also be formed from a material that is, for example, softer and more pliant.

The holding rims 18, 21 provided in the described embodiments can be produced in the injection-molding process in a simple way together with the rim walls. The guidance and holding of the rolling elements in the recirculating channel can be secured by plastic elements that are equipped with the holding rims according to the invention.

LIST OF REFERENCE SYMBOLS

1 Carriage
2 Guide rail
3 Recirculating channel
4 Load section
5 Return section
6 Turnaround section
7 Roller chain
8 Rolling element chain
9 Rim wall 10 Rim wall
11 Rim wall
12 Cage strip
13 Separating web
13a Separating wall
14 Roller
14a Cage pocket
15 Cage belt
15a End piece
15b End piece
16 Recess
17 u-shaped groove
18 Holding rim
19 Roller chain
20 Recess
21 Holding rim
22 u-shaped groove
23 Roller chain
24 End piece
25 Stop

The invention claimed is:

1. Rolling element chain comprising a plurality of rolling bodies arranged in a row one after the other in a cage strip and separated from one another by separating webs of the cage strip, the cage strip is formed by the separating webs being connected on one side at a front end thereof arranged transverse to the rolling element chain to a flexible cage belt which extends along the rolling element chain, the separating webs are provided on the other side at an opposite free end thereof arranged transverse to the rolling element chain with continuous recesses that extend in a direction of extent of the rolling element chain for the engagement of a holding rim for holding the rolling element chain.

2. Rolling element chain according to claim 1, wherein adjacent ones of the separating webs bound cage pockets for holding the rolling elements and have concavely curved separating walls which are adapted to a peripheral surface of the rolling elements.

3. Rolling element chain according to claim 1, wherein the chain has a finite construction with two end pieces and is provided for an endless rolling element circuit in an endless recirculating channel, wherein on at least one of the two end pieces at a free front end facing away from the flexible cage belt there is a pressure tab projecting toward the other of the end pieces as a stop for the two end pieces against one another.

4. Rolling element chain according to claim 3, wherein a distance set in a circulating direction of the rolling element chain between the two end pieces is smaller than or equal to a reference circle end play of the rolling element chain.

5. Rolling element chain according to claim 1, wherein the holding rim oriented in the endless recirculating channel for holding the rolling element chain is provided as a part of the endless recirculating channel.

6. Linear roller bearing comprising a carriage having an endless recirculating channel in which there is rolling element chain having a plurality of rolling bodies arranged in a row one after the other in a cage strip and separated from one another by separating webs of the cage strip, the cage strip is formed by the separating webs being connected on one side at a front end thereof arranged transverse to the rolling element chain to a flexible cage belt which extends along the rolling element chain, the separating webs are provided on the other side at an opposite free end thereof arranged transverse to the rolling element chain with continuous recesses that extend in a direction of extent of the rolling element chain for the engagement of a holding rim for holding the rolling element chain, the recirculating channel is bounded by opposing rim walls and one of the rim walls is provided with a holding groove for engagement with the flexible cage belt and the other of the rim walls is provided with the holding rim for engagement in the recesses of the separating webs of the cage strip.

* * * * *